US012297125B2

(12) United States Patent
Xu et al.

(10) Patent No.: US 12,297,125 B2
(45) Date of Patent: May 13, 2025

(54) METHOD FOR PREPARING BATTERY-GRADE NICKEL-COBALT-MANGANESE SULFATE CRYSTALS FROM LOW NICKEL MATTE

(71) Applicants: PT QMB NEW ENERGY MATERIALS, Jakarta (ID); PT ESG NEW ENERGY MATERIAL, Jakarta (ID); GEM CO., LTD., Shenzhen (CN); PT GEM INDONESIA NEW ENERGY MATERIALS, Jakarta (ID)

(72) Inventors: Kaihua Xu, Shenzhen (CN); Satryo Soemantri Brodjonegoro, Jakarta (ID); Guoquan Jin, Jakarta (ID); Tegar Mukti Aji, Jakarta (ID); Rizky Wanaldi, Jakarta (ID); Andi Syaputra Hasibuan, Jakarta (ID); Evan Wahyu Kristiyanto, Jakarta (ID); Emil Salim, Jakarta (ID)

(73) Assignees: PT QMB NEW ENERGY MATERIALS, Jakarta (ID); PT ESG NEW ENERGY MATERIAL, Jakarta (ID); GEM CO., LTD., Shenzhen (CN); PT GEM INDONESIA NEW ENERGY MATERIALS, Jakarta (ID)

( * ) Notice: Subject to any disclaimer, the term of this patent is extended or adjusted under 35 U.S.C. 154(b) by 0 days.

(21) Appl. No.: 18/870,413

(22) PCT Filed: Jul. 26, 2023

(86) PCT No.: PCT/CN2023/109306
§ 371 (c)(1),
(2) Date: Nov. 28, 2024

(87) PCT Pub. No.: WO2025/020125
PCT Pub. Date: Jan. 30, 2025

(65) Prior Publication Data
US 2025/0109040 A1 Apr. 3, 2025

(51) Int. Cl.
*C01G 53/10* (2006.01)
*C22B 3/08* (2006.01)
*C22B 3/26* (2006.01)

(52) U.S. Cl.
CPC ............... *C01G 53/10* (2013.01); *C22B 3/08* (2013.01); *C22B 3/26* (2021.05)

(58) Field of Classification Search
None
See application file for complete search history.

(56) References Cited

U.S. PATENT DOCUMENTS

2015/0000466 A1* 1/2015 Liu ............... C22B 23/0461
423/139
2019/0152797 A1* 5/2019 Liu ............... B01D 9/0031
(Continued)

FOREIGN PATENT DOCUMENTS

CN 113957264 A 1/2022

OTHER PUBLICATIONS

Claims of PCT/CN2023/109306, Jul. 26, 2023.
CNIPA (ISA), Written opinion for PCT/CN2023/109306, Dec. 20, 2023.

*Primary Examiner* — John J Figueroa
(74) *Attorney, Agent, or Firm* — Hemisphere Law, PLLC; Zhigang Ma

(57) ABSTRACT

The disclosure discloses a method for preparing battery-grade nickel-cobalt-manganese sulfate crystals from low nickel matte, which includes the following steps: S1, sequentially performing high-pressure leaching, iron-aluminum removal and nickel-cobalt-manganese precipitation treatment on laterite nickel ore to obtain an underflow containing nickel-cobalt-manganese hydroxide, wherein the pH value of the underflow is 7-8; S2, performing oxygen-pressure leaching on the low nickel matte using sulfuric acid and oxygen to obtain a leached slurry containing residual (Continued)

acid, adding the underflow into the leached slurry to obtain a mixed slurry, and adjusting the pH value of the mixed slurry to be 3-5 using the underflow; and S3, performing filter pressing on the mixed slurry to obtain filtrate and tailings, and performing nickel-cobalt-manganese co-extraction, concentration and crystallization on the filtrate to obtain the nickel-cobalt-manganese sulfate crystals. The method has the advantages of high utilization rate of nickel, cobalt and manganese, few impurities, reduced reagent consumption and technological processes, and high transportation efficiency.

9 Claims, 1 Drawing Sheet

(56) References Cited

U.S. PATENT DOCUMENTS

| | | | | |
|---|---|---|---|---|
| 2021/0354997 | A1* | 11/2021 | Osten | C22B 3/26 |
| 2021/0376399 | A1* | 12/2021 | Morin | C22B 1/005 |
| 2022/0009793 | A1* | 1/2022 | Fraser | C01G 51/04 |
| 2023/0046474 | A1* | 2/2023 | Fraser | C01G 51/10 |
| 2023/0399240 | A1* | 12/2023 | Yu | C22B 3/3844 |

\* cited by examiner

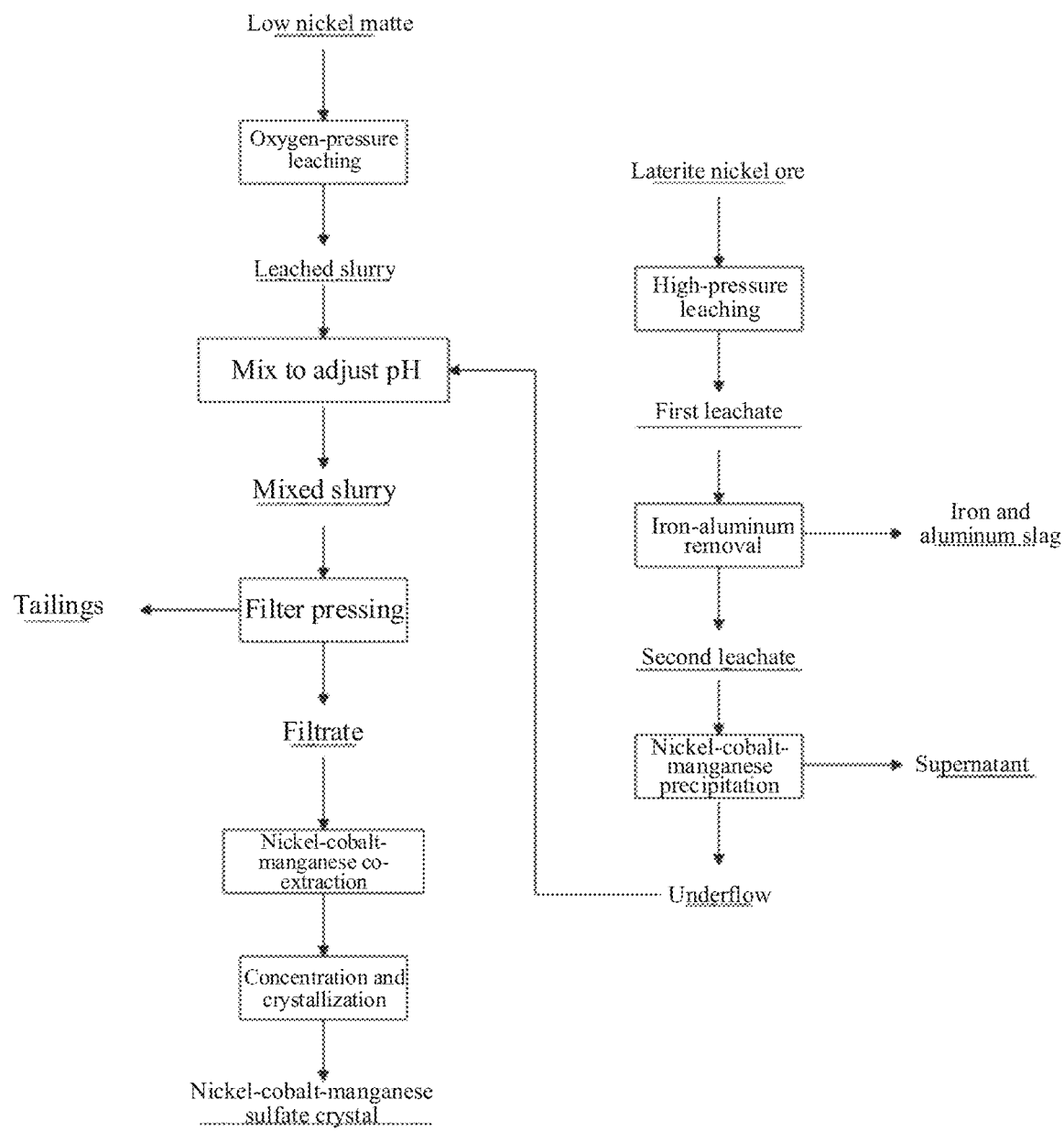

METHOD FOR PREPARING BATTERY-GRADE NICKEL-COBALT-MANGANESE SULFATE CRYSTALS FROM LOW NICKEL MATTE

FIELD OF THE DISCLOSURE

The disclosure relates to the technical field of hydrometallurgy, in particular to a method for preparing battery-grade nickel-cobalt-manganese sulfate crystals from low nickel matte.

BACKGROUND

Nickel, cobalt and manganese are important new energy materials, while laterite nickel ore is one of the main sources of nickel, cobalt and manganese metals. The pyrometallurgical process is applied due to its advantages of simple operation and short technological process, in which high nickel matte is prepared by reduction roasting, high-temperature impurity removal and other steps. For example, a process of "laterite nickel ore-electric furnace smelting (vulcanization)-low nickel matte-converter blowing-high nickel matte" has been widely adopted by various smelting plants. Specifically, laterite nickel ore is dried and pre-reduced by a rotary kiln, then smelted by an electric furnace, added with a vulcanizing agent at the same time to obtain low nickel matte (Ni content of about 20%, and Fe content of about 65%), and then blown by a PS converter to prepare high nickel matte (Ni content of about 60%, and Fe content of about 5%). The resulting high nickel matte, which is a crude product, is used as a raw material in various fields such as stainless steel and battery materials. However, a pyrometallurgical smelting process of high-grade laterite nickel ore focuses only on nickel, and in the process of blowing from low nickel matte to high nickel matte, although the content of nickel in the product increases, the associated cobalt and manganese in the laterite nickel ore are not considered, resulting in a large waste of resources, and the huge energy consumption makes the cost of pyrometallurgical smelting to produce high nickel matte be significantly higher than that of the wet process. As a primary product in the pyrometallurgical smelting procedure, the low nickel matte, which is a nickel-iron alloy, contains cobalt, manganese and other metals at the same time. The preparation of a high-purity nickel-cobalt-manganese sulfate solution from low nickel matte as a raw material can significantly reduce the technological process and increase a utilization rate of nickel cobalt and manganese metals. In related technologies, after nickel, cobalt and manganese are subjected to selective leaching directly using the low nickel matte as a raw material, the impurity Fe content in a leaching solution is very high. Therefore, the pH of a leached solution needs to be adjusted using lime milk, impurity ions need to be preliminarily removed, and then single nickel sulfate, cobalt sulfate and manganese sulfate crystals are prepared through an extraction process, resulting in complex technological process, large acid consumption and low utilization rate of nickel, cobalt and manganese.

In addition, low-grade laterite nickel ore can be prepared into nickel-cobalt-manganese hydroxide as an intermediate product by means of high-pressure hydrometallurgical smelting process, precipitation and impurity removal. A hydrometallurgical smelting plant can further purify nickel, cobalt and manganese, which is also another important means to obtain nickel, cobalt and manganese. A filter cake of the nickel-cobalt-manganese hydroxide contains about 50-55% of water, so the transportation cost is high during the transfer process, and the cost is increased due to more than half being water. During the purification process, an acid is added to dissolve the nickel-cobalt-manganese hydroxide again, and after extraction, single nickel sulfate, cobalt sulfate, and manganese sulfate solutions are prepared respectively. The additional sulfuric acid also increases the reagent consumption, more nickel, cobalt, and manganese are lost, and the process is complex.

Therefore, it is necessary to provide a technical solution that can simultaneously solve the problems of low utilization rate of nickel, cobalt and manganese, high reagent consumption, complex process and inconvenient transportation coexisting in the process of extracting nickel, cobalt and manganese from low nickel matte and low-grade laterite nickel ore.

SUMMARY

In view of this, the disclosure provides a method for preparing battery-grade nickel-cobalt-manganese sulfate crystals from low nickel matte, which has the advantages of high utilization rate, few impurities, reduced reagent consumption and technological process, and high transportation efficiency.

To fulfill said technical objective, the disclosure adopts the following technical solutions.

The disclosure provides a method for preparing battery-grade nickel-cobalt-manganese sulfate crystals from low nickel matte, including the following steps:

S1, sequentially performing high-pressure leaching, iron-aluminum removal and nickel-cobalt-manganese precipitation treatment on laterite nickel ore to obtain an underflow containing nickel-cobalt-manganese hydroxide, wherein the pH value of the underflow is 7-8;

S2, performing oxygen-pressure leaching on the low nickel matte using sulfuric acid and oxygen to obtain a leached slurry containing residual acid, adding the underflow into the leached slurry to obtain a mixed slurry, and adjusting the pH value of the mixed slurry to be 3-5 using the underflow; and S3, performing filter pressing on the mixed slurry to obtain filtrate and tailings, and performing nickel-cobalt-manganese co-extraction, concentration and crystallization on the filtrate to obtain the nickel-cobalt-manganese sulfate crystals.

Preferably, technological conditions for the iron-aluminum removal in step S1 are as follows: the temperature is controlled at 80-85° C. and the pH is 2-5.

Preferably, technological conditions for the nickel-cobalt-manganese precipitation in step S1 are as follows: the temperature is controlled at 70-80° C. and the pH is 7-8.

Preferably, technological conditions for the high-pressure leaching in step S1 are as follows: the temperature is controlled at 250-260° C., the pressure is 4.5-5 MPa, and time of the high-pressure leaching is 1 h. Preferably, in step S2, the temperature of the oxygen-pressure leaching is 180-220° C., the pressure of the oxygen-pressure leaching is 2.5-3.3 MPa, the oxygen partial pressure of the oxygen-pressure leaching is 20-30%, and time of the oxygen-pressure leaching is 2-10 h.

Preferably, in step S3, the extractant used in the nickel-cobalt-manganese co-extraction is DY319 extractant.

Preferably, the low nickel matte has a particle size of 74-150 μm.

Preferably, in step S2, the sulfur ore ratio of the sulfuric acid to the low nickel matte is (0.025-0.625):1.

Preferably, in step S2, the pH value of the mixed slurry is adjusted to be 5 using the underflow.

In a second aspect, the disclosure provides a battery-grade nickel-cobalt-manganese sulfate crystal.

The disclosure has the following beneficial effects.

In the disclosure, the disadvantage of excessive iron in low nickel matte is overcome, where most of the iron is converted into ferric oxide and sulfuric acid through a hydrolysis reaction of oxygen-pressure leaching, while the rest of the iron exists in the form of $Fe^{3+}$ in the leached slurry. Iron hydroxide is formed by adjusting pH to be 3-5 using the underflow after high-pressure leaching of the laterite nickel ore, and iron oxide and iron hydroxide enter a slag phase to remove iron impurities in the low nickel matte.

In the disclosure, by combining an oxygen-pressure leaching process of low nickel matte with a high-pressure leaching process of laterite nickel ore, the slurry obtained by oxygen-pressure leaching of low nickel matte is combined with the underflow obtained by nickel-cobalt-manganese precipitation after high-pressure leaching process of laterite nickel ore, which is not only conducive to the removal of iron impurities in the low nickel matte, but also consumes the residual acid in the leached slurry obtained by the oxygen-pressure leaching of the low nickel matte in the iron removal process. At the same time, the nickel-cobalt-manganese hydroxide in the underflow obtained by nickel-cobalt-manganese precipitation is dissolved again into nickel ions, manganese ions and cobalt ions, which then enter a liquid phase and merge with a liquid phase containing nickel, cobalt and manganese in the low nickel matte. Then, the nickel, cobalt, and manganese in the liquid phase are recovered directly through co-extraction. In this scheme, the utilization rate of nickel, cobalt, and manganese is high, the reagent consumption can be reduced, the use of a filter press is used to the maximum extent, the transportation efficiency is improved, and the process step for subsequent treatment of the nickel-cobalt-manganese hydroxide is shortened at the same time.

BRIEF DESCRIPTION OF THE DRAWING

FIGURE is a process flowchart of the disclosure.

DETAILED DESCRIPTION OF PREFERRED EMBODIMENTS

In order to make the objects, technical solutions and advantages of the disclosure clearer, the following will describe the disclosure in detail in conjunction with examples. It should be understood that the specific examples described here are only used to explain the disclosure, but not used to limit the disclosure.

The disclosure provides a method for preparing battery-grade nickel-cobalt-manganese sulfate crystals from low nickel matte, including the following steps:

S1, sequentially performing high-pressure leaching, iron-aluminum removal and nickel-cobalt-manganese precipitation treatment on laterite nickel ore to obtain an underflow containing nickel-cobalt-manganese hydroxide, wherein the pH value of the underflow is 7-8;

S2, performing oxygen-pressure leaching on the low nickel matte using sulfuric acid and oxygen to obtain a leached slurry containing residual acid, adding the underflow into the leached slurry to obtain a mixed slurry, and adjusting the pH value of the mixed slurry to be 2-5 using the underflow; and S3, performing filter pressing on the mixed slurry to obtain filtrate and tailings, and performing nickel-cobalt-manganese co-extraction, concentration and crystallization on the filtrate to obtain the nickel-cobalt-manganese sulfate crystals.

The specific technological process is shown in FIGURE. The present scheme is formed by the combination of two processes. In step S1, using the laterite nickel ore as a raw material, a first leaching solution is obtained by high-pressure leaching. The leaching solution contains Fe, Al, Mn, Ni, Co, and other impurities. Then, the first leaching solution is subjected to iron-aluminum removal to obtain aluminum-iron slag and a second leaching solution. Iron and aluminum are removed by precipitation in the form of iron-aluminum slag. The second leaching solution contains Mn, Ni, Co and impurities. Then, the second leaching solution is subjected to nickel-cobalt-manganese precipitation treatment to obtain a supernatant and an underflow precipitate. The underflow precipitate is a slurry containing nickel-cobalt-manganese hydroxide, and pH of the underflow is 7-8. In step S2, using the low nickel matte as a raw material, oxygen-pressure leaching is performed under the action of oxygen and sulfuric acid to obtain a leached slurry. The leached slurry contains residual acid, a slurry slag phase, and a slurry liquid phase. The slurry slag phase includes ferric oxide obtained by oxygen-pressure leaching hydrolysis. The slurry liquid phase contains unhydrolyzed iron ions. The residual acid is derived from sulfuric acid added before oxygen-pressure leaching and sulfuric acid produced by oxygen-pressure leaching hydrolysis. The underflow obtained in step S1 is mixed with the leached slurry. By utilizing the difference in pH values of the underflow and the leached slurry, a mixing ratio of the underflow to the leached slurry is adjusted and the resulting mixture is the mixed slurry, wherein the pH value of the mixed slurry is 3-5. The mixed slurry is a mixture of solid and liquid phases after the reaction of the underflow and the leached slurry. The main components of the solid phase are ferric oxide slag and iron hydroxide slag, the main components of the liquid phase are nickel, cobalt and manganese salt solutions, and nickel, cobalt, and manganese in the liquid phase are derived from the low nickel matte and the laterite nickel ore. After step S2, the nickel-cobalt-manganese hydroxide is converted into soluble nickel, cobalt, and manganese. Therefore, the increase of nickel-cobalt-manganese content in the liquid phase is conducive to subsequent extraction and improves the extraction efficiency. In step S3, the solid phase and the liquid phase in the mixed slurry are separated by filter pressing to obtain tailings and filtrate respectively, and then the filtrate is subjected to nickel-cobalt-manganese co-extraction, concentration and crystallization to obtain the nickel-cobalt-manganese sulfate crystals.

In the disclosure, by combining the extraction of nickel, cobalt, and manganese from the low nickel matte with the treatment process of the underflow of the laterite nickel core, the following problems can be solved at the same time: 1, the content of iron in the low nickel matte is too high, and the iron removal process is complicated, affecting the purity of nickel, cobalt, and manganese finished products; 2, the utilization rate of nickel, cobalt and manganese in the laterite nickel ore and the low nickel matte is low; 3, when the two processes are performed separately, the consumption of lime, sulfuric acid and other reagents is too large; 4, a filter press is used too many times and the process is complex; and 5, the underflow product of the nickel-cobalt-manganese hydroxide contains too much water, resulting in high transportation cost.

A principle of the disclosure is as follows: by combining the leaching process of the low nickel matte with the high-pressure leaching process of the laterite nickel ore, the leached slurry containing residual acid obtained by the oxygen-pressure leaching of the low nickel matte is combined with the underflow obtained by the nickel-cobalt-manganese precipitation after the high-pressure leaching process of the laterite nickel ore. By using the difference in acidity and alkalinity between the leached slurry and the underflow, the residual acid in the leached slurry of the low nickel matte is consumed. At the same time, the amount of the underflow is adjusted to reach a condition of precipitating $Fe^{3+}$, and iron hydroxide is formed to remove an impurity $Fe^{3+}$ dissolved in the leached slurry. Meanwhile, the underflow obtained by the nickel-cobalt-manganese (containing nickel-cobalt-manganese hydroxide, having pH of 7-8) precipitation of the laterite nickel ore changes in pH after being mixed with the leached slurry, the nickel-cobalt-manganese hydroxide is dissolved again and enters the liquid phase of the mixed slurry to form nickel-cobalt-manganese ions, which are then subjected to subsequent treatment, overcoming the step in which excessive water in the underflow product of the nickel-cobalt-manganese hydroxide needs to be transported by filter pressing, and improving the efficiency of subsequent extraction of nickel, cobalt and manganese. The underflow is mixed with the leached slurry to obtain the mixed slurry, the mixed slurry is subjected to filter pressing to obtain filtrate, and then the nickel, cobalt and manganese in the filtrate can be directly recovered through co-extraction. Meanwhile, the utilization rate of nickel, cobalt and manganese in the low nickel matte and the laterite nickel ore is increased, the reagent consumption is reduced, and the transportation efficiency is improved.

In the disclosure, the use of the filter press is reduced to the maximum extent. In the prior art, a filter press is required in the subsequent step of treating nickel-cobalt-manganese hydroxide. In addition, after oxygen-pressure leaching of low nickel matte, filter pressing treatment is needed after pH is adjusted to remove impurities, achieving a solid-liquid separation effect. In the disclosure, the two processes are combined, in which filter pressing is performed once after the pH value is adjusted finally, the nickel-cobalt-manganese co-extraction is performed in the filtrate, and then the nickel-cobalt-manganese sulfate crystals can be directly prepared through crystallization, and then accordingly transported, thereby not only avoiding the problem of excessive water in the underflow product of the nickel-cobalt-manganese hydroxide contained in the laterite nickel ore, but also achieving direct trading with nickel-cobalt-manganese sulfate as a raw material to improve the economic benefits of enterprises.

Technological conditions for the iron-aluminum removal in step S1 are as follows: a temperature is controlled at 80-85° C. and pH is 2-5. The leaching solution is subjected to iron-aluminum removal through the above-mentioned process, and iron-aluminum slag and a second leaching solution are obtained after separation, wherein the second leaching solution contains Mn, Ni, Co and a small amount of unprecipitated iron ions and aluminum ions.

Technological conditions for the nickel-cobalt-manganese precipitation in step S1 are as follows: a temperature is controlled at 70-80° C. and pH is 7-8. The second leaching solution obtained by iron-aluminum removal is subjected to nickel-cobalt-manganese precipitation according to the above-mentioned process to obtain an underflow precipitate, which contains nickel-cobalt-manganese hydroxide, and at this time, pH of the underflow is 7-8.

Technological conditions for the high-pressure leaching in step S1 are as follows: the reaction is performed for 1 h at a temperature of 250-260° C. and the pressure of 4.5-5 Mpa; equipment used is the autoclave; the first leaching solution is obtained by high-pressure leaching and separation; and the first leaching solution contains Fe, Al, Mn, Ni, Co and other impurities.

In step S2, the temperature of the oxygen-pressure leaching is 180-220° C., the pressure of the oxygen-pressure leaching is 2.5-3.3 MPa, the oxygen partial pressure of the oxygen-pressure leaching is 20-30%, and time of the oxygen-pressure leaching is 2-10 h. By the oxygen-pressure leaching, most of iron in the low nickel matte can be hydrolyzed to form ferric oxide, which exists in the leached slurry, but there are still a large number of unhydrolyzed iron impurities in the leached slurry.

In step S3, the extractant used in the nickel-cobalt-manganese co-extraction is DY319 extractant.

In step S2, the sulfur ore ratio of the sulfuric acid to the low nickel matte is (0.025-0.625):1. Under this condition, it is ensured that Fe can be hydrolyzed into iron oxide to the maximum extent.

The low nickel matte has a particle size of 74-150 μm.

In step S2, the pH value of the mixed slurry is adjusted to be 5 using the underflow. At this pH value, the formation of Fe ions into ferric hydroxide is most favorable.

The disclosure provides a battery-grade nickel-cobalt-manganese sulfate crystal which has high purity and low content of impurity Fe.

This scheme is further described below in conjunction with specific examples.

Example 1

A method for preparing battery-grade nickel-cobalt-manganese sulfate crystals from low nickel matte includes the following steps S1-S3.

In S1, 100 kg of laterite nickel ore was placed in an autoclave, reacted for 1 h at the temperature of 250° C. and the pressure of 4.5 MPa, subjected to high-pressure leaching, and then allowed to stand to obtain a first leaching solution; pH of the first leaching solution was adjusted to be 2, and the temperature was controlled to be 80° C. for iron-aluminum removal; after standing, iron and aluminum slag and a second leaching solution were obtained; pH of the second leaching solution was adjusted to be 8, and the temperature was controlled to be 70° C. for nickel-cobalt-manganese precipitation treatment; and after standing, a supernatant and an underflow precipitate were obtained, wherein the underflow precipitate contained nickel-cobalt-manganese hydroxide, and had pH of 8.

In S2, 100 kg of low nickel matte was ball-milled to obtain low nickel matte with a particle size of 150 μm; sulfuric acid and the ball-milled low nickel matte were put into the autoclave according to the sulfur ore ratio of 0.625:1 and continued to be added with the sulfuric acid, and oxygen was introduced to perform high-temperature oxygen-pressure leaching, followed by a hydrolysis reaction, wherein the temperature of the oxygen-pressure leaching was 220° C., the pressure of the oxygen-pressure leaching was 3.3 MPa, the oxygen partial pressure of the oxygen-pressure leaching was 30%, and time of the oxygen-pressure leaching was 10 h; after the end of oxygen-pressure leaching, a leached slurry containing residual acid was obtained; the underflow was added to the leached slurry to obtain a mixed slurry; and the amount of the underflow was adjusted until the pH value of the mixed slurry was 5.

In S3, filter pressing was performed on the mixed slurry to obtain filtrate and tailings, the DY319 extractant was added to the filtrate for nickel-cobalt-manganese co-extraction to obtain a nickel-cobalt-manganese sulfate solution, and the nickel-cobalt-manganese sulfate solution was concentrated and crystallized to obtain the nickel-cobalt-manganese sulfate crystals.

Example 2

A method for preparing battery-grade nickel-cobalt-manganese sulfate crystals from low nickel matte, with the other steps being the same as in Example 1, differed from Example 1 in that the temperature of the oxygen-pressure leaching was 220° C., the pressure of the oxygen-pressure leaching was 2.8 MPa, the oxygen partial pressure of the oxygen-pressure leaching was 20%, and the time of the oxygen-pressure leaching was 10 h.

Example 3

A method for preparing battery-grade nickel-cobalt-manganese sulfate crystals from low nickel matte, with the other steps being the same as in Example 1, differed from Example 1 in that in step S2, the pH of the mixed slurry was 4.

Example 4

A method for preparing battery-grade nickel-cobalt-manganese sulfate crystals from low nickel matte includes the following steps S1-S3.

In S1, 100 kg of laterite nickel ore was placed in an autoclave, reacted for 1 h at the temperature of 260° C. and the pressure of 5 MPa, subjected to high-pressure leaching, and then allowed to stand to obtain a first leaching solution; pH of the first leaching solution was adjusted to be 5, and the temperature was controlled to be 85° C. for iron-aluminum removal; after standing, iron and aluminum slag and a second leaching solution were obtained; pH of the second leaching solution was adjusted to be 7, and the temperature was controlled to be 80° C. for nickel-cobalt-manganese precipitation treatment; and after standing, a supernatant and an underflow precipitate were obtained, wherein the underflow precipitate contained nickel-cobalt-manganese hydroxide, and had pH of 7.

In S2, 100 kg of low nickel matte was ball-milled to obtain low nickel matte with a particle size of 74 μm; sulfuric acid and the ball-milled low nickel matte were put into the autoclave according to the sulfur ore ratio of 0.025:1 and continued to be added with the sulfuric acid, and oxygen was introduced to perform high-temperature oxygen-pressure leaching, followed by a hydrolysis reaction, wherein a temperature of the oxygen-pressure leaching was 180° C., the pressure of the oxygen-pressure leaching was 2.5 MPa, the oxygen partial pressure of the oxygen-pressure leaching was 25%, and time of the oxygen-pressure leaching was 2 h; after the end of oxygen-pressure leaching, a leached slurry containing residual acid was obtained; the underflow was added to the leached slurry to obtain a mixed slurry; and the amount of the underflow was adjusted until the pH value of the mixed slurry was 3.

In S3, filter pressing was performed on the mixed slurry to obtain filtrate and tailings, the DY319 extractant was added to the filtrate for nickel-cobalt-manganese co-extraction to obtain a nickel-cobalt-manganese sulfate solution, and the nickel-cobalt-manganese sulfate solution was concentrated and crystallized to obtain the nickel-cobalt-manganese sulfate crystals.

Comparative Example 1

A method for preparing battery-grade nickel-cobalt-manganese sulfate crystals from low nickel matte includes the following steps K1-K2.

In K1, 100 kg of low nickel matte was ball-milled to obtain low nickel matte with a particle size of 150 μm; sulfuric acid and the ball-milled low nickel matte were put into the autoclave according to the sulfur ore ratio of 0.625:1 and continued to be added with the sulfuric acid, and oxygen was introduced to perform high-temperature oxygen-pressure leaching, followed by a hydrolysis reaction, wherein the temperature of the oxygen-pressure leaching was 220° C., the pressure of the oxygen-pressure leaching was 3.3 MPa, the oxygen partial pressure of the oxygen-pressure leaching was 30%, and time of the oxygen-pressure leaching was 10 h; after the end of oxygen-pressure leaching, a leached slurry containing residual acid was obtained; and lime milk was added to adjust pH to be 4, and a mixture was obtained.

In K2, filter pressing was performed on the mixture to obtain filtrate and tailings, the DY319 extractant was added to the filtrate for nickel-cobalt-manganese co-extraction to obtain a nickel-cobalt-manganese sulfate solution, and the nickel-cobalt-manganese sulfate solution was concentrated and crystallized to obtain the nickel-cobalt-manganese sulfate crystals.

Evaluation Test

The purity and Fe impurity content, as well as the recovery rate of nickel, cobalt and manganese in the nickel-cobalt-manganese sulfate crystals in Examples 1-3 and in Comparative example 1 were tested. The test results were shown in Table 1.

TABLE 1

Test results of purity and utilization rates of products

| | Purity of nickel-cobalt-manganese sulfate | Total recovery rate of nickel, cobalt and manganese |
|---|---|---|
| Example 1 | 99.68% | 96.14% |
| Example 2 | 99.46% | 90.64% |
| Example 3 | 99.49% | 95.63% |
| Example 4 | 99.21% | 92.24% |
| Comparative example 1 | 99.27% | 93.17% |

In Table 1, compared with Example 2, in Example 1, the reduction of oxygen partial pressure and oxygen amount led to a decrease in the total recovery rate of nickel, cobalt and manganese, mainly due to the decrease in oxygen content, which would limit the efficiency of the conversion of Fe to $Fe^{3+}$ in nickel matte, and could not produce sulfuric acid by hydrolysis, thereby affecting a leaching rate of Ni, Co and Mn.

Compared with Example 3, in Example 1, the pH value of the mixed slurry in step S2 was different, resulting in difference of the degree of Fe ion precipitation, indicating that a removal effect of Fe impurity in Example 1 was better than that of Example 3.

Compared with Example 3, in Comparative example 1, the process of extracting nickel-cobalt-manganese sulfate from low nickel matte was performed separately, and had the same technological conditions as Example 3, but was not combined with the treatment process of the underflow in laterite nickel ore, and although it could also prepare nickel-cobalt-manganese sulfate crystals having higher purity, but slightly lower purity and recovery rate than those of Example 3, the whole process required a large amount of lime milk for impurity removal, resulting in high reagent cost.

In Examples 1-4, the purity of the obtained nickel-cobalt-manganese sulfate crystals was greater than 99%, and the recovery rate was greater than 90%, indicating that this scheme had a good recovery rate for nickel, cobalt and manganese, as well as few impurities and high purity. From the perspective of technological process, there was no additional use of too many additional reagents, which was conducive to reducing the cost.

The above are only preferred specific embodiments of the disclosure, but the protection scope of the disclosure is not limited thereto. Within the technical scope disclosed in the disclosure, any changes or replacements easily derived by a person skilled in the art shall fall within the protection scope of the disclosure.

What is claimed is:

1. A method for preparing battery-grade nickel-cobalt-manganese sulfate crystals from low nickel matte, comprising the following steps:
   S1, sequentially performing high-pressure leaching, iron-aluminum removal and nickel-cobalt-manganese precipitation treatment on a laterite nickel ore to obtain an underflow containing nickel-cobalt-manganese hydroxide, wherein the pH value of the underflow is 7-8;
   S2, performing oxygen-pressure leaching on the low nickel matte using sulfuric acid and oxygen to obtain a leached slurry containing residual acid, adding the underflow into the leached slurry to obtain a mixed slurry, and adjusting the pH value of the mixed slurry to be 3-5 using the underflow; and
   S3, performing filter pressing on the mixed slurry to obtain filtrate and tailings, and performing nickel-cobalt-manganese co-extraction, concentration and crystallization on the filtrate to obtain the nickel-cobalt-manganese sulfate crystals.

2. The method for preparing the battery-grade nickel-cobalt-manganese sulfate crystals from low nickel matte according to claim 1, wherein technological conditions for the iron-aluminum removal in step S1 are as follows: the temperature is controlled at 80-85° C. and the pH is 2-5.

3. The method for preparing the battery-grade nickel-cobalt-manganese sulfate crystals from low nickel matte according to claim 1, wherein technological conditions for the nickel-cobalt-manganese precipitation in step S1 are as follows: the temperature is controlled at 70-80° C. and the pH is 7-8.

4. The method for preparing the battery-grade nickel-cobalt- manganese sulfate crystals from low nickel matte according to claim 1, wherein technological conditions for the high-pressure leaching in step S1 are as follows: the temperature is controlled at 250-260° C., the pressure is 4.5-5 MPa, and time of the high-pressure leaching time is 1 h.

5. The method for preparing the battery-grade nickel-cobalt-manganese sulfate crystals from low nickel matte according to claim 1, wherein in step S2, the temperature of the oxygen-pressure leaching is 180-220° C., the pressure of the oxygen-pressure leaching is 2.5-3.3 MPa, the oxygen partial pressure of the oxygen-pressure leaching is 20-30%, and time of the oxygen-pressure leaching is 2-10 h.

6. The method for preparing the battery-grade nickel-cobalt-manganese sulfate crystals from low nickel matte according to claim 1, wherein in step S3, the extractant used in the nickel-cobalt-manganese co-extraction is DY319 extractant.

7. The method for preparing the battery-grade nickel-cobalt-manganese sulfate crystals from low nickel matte according to claim 1, wherein the low nickel matte has a particle size of 74-150 μm.

8. The method for preparing the battery-grade nickel-cobalt-manganese sulfate crystals from low nickel matte according to claim 1, wherein in step S2, the sulfur ore ratio of the sulfuric acid to the low nickel matte is (0.025-0.625):1.

9. The method for preparing the battery-grade nickel-cobalt-manganese sulfate crystals from low nickel matte according to claim 1, wherein in step S2, the pH value of the mixed slurry is adjusted to be 5 using the underflow.

* * * * *